United States Patent
Lekatsas et al.

(10) Patent No.: US 9,065,544 B2
(45) Date of Patent: Jun. 23, 2015

(54) PULSE-BASED BINARY COMMUNICATION

(71) Applicant: OSRAM SYLVANIA Inc., Danvers, MA (US)

(72) Inventors: Nicholas Lekatsas, North Andover, MA (US); Anant Aggarwal, Waltham, MA (US); Biju Antony, Lynnfield, MA (US)

(73) Assignee: OSRAM SYLVANIA Inc.

( * ) Notice: Subject to any disclaimer, the term of this patent is extended or adjusted under 35 U.S.C. 154(b) by 97 days.

(21) Appl. No.: 13/630,676

(22) Filed: Sep. 28, 2012

(65) Prior Publication Data

US 2014/0093002 A1 Apr. 3, 2014

(51) Int. Cl.
*H04L 27/00* (2006.01)
*H04B 3/54* (2006.01)

(52) U.S. Cl.
CPC .......... *H04B 3/548* (2013.01); *H04B 2203/547* (2013.01)

(58) Field of Classification Search
CPC ..... H04L 7/027; H04L 12/2898; H04L 27/00; H04B 1/38
USPC ......... 375/211, 214, 220, 259, 286–287, 219, 375/222
See application file for complete search history.

(56) References Cited

U.S. PATENT DOCUMENTS

| | | | | |
|---|---|---|---|---|
| 4,307,380 A * | 12/1981 | Gander | .................... | 340/538.11 |
| 4,398,178 A * | 8/1983 | Russ et al. | ........................ | 307/3 |
| 4,555,593 A * | 11/1985 | O'Dea | .......................... | 379/304 |
| 5,132,828 A * | 7/1992 | Conner et al. | ................. | 398/158 |
| 5,198,810 A * | 3/1993 | Harel | ........................ | 340/870.13 |
| 5,247,292 A * | 9/1993 | Nakanishi et al. | .......... | 340/10.34 |
| 5,355,137 A * | 10/1994 | Schurmann | ...................... | 342/42 |
| 5,473,635 A * | 12/1995 | Chevroulet | .................... | 375/287 |
| 5,847,662 A * | 12/1998 | Yokota et al. | .............. | 340/10.34 |
| 5,869,962 A * | 2/1999 | Kasumi et al. | ............ | 324/207.21 |
| 5,872,429 A | 2/1999 | Xia et al. | | |

(Continued)

FOREIGN PATENT DOCUMENTS

| | | |
|---|---|---|
| DE | 197 25 710 A1 | 1/1998 |
| EP | 0 798 901 A1 | 10/1997 |

(Continued)

OTHER PUBLICATIONS

M De Iulis, International Search Report and Written Opinion of the International Searching Authority for PCT/US2013/060415, Dec. 20, 2013, pp. 1-9, European Patent Office, Rijswijk, the Netherlands.

(Continued)

*Primary Examiner* — Emmanuel Bayard
(74) *Attorney, Agent, or Firm* — Shaun P. Montana

(57) ABSTRACT

Systems and methods for pulse-based binary communication are provided. An example system may include a transmitting device and a receiving device. The transmitting device may be configured to generate a supply voltage for use in operating the receiving device and to cause at least one pulse to occur in the supply voltage, the at least one pulse being based on a binary value. The at least one pulse may comprise, for example, a temporary change in the supply voltage. The receiving device may be configured to receive the supply voltage from the transmitting device, to detect the at least one pulse in the supply voltage and to determine the binary value based on the at least one pulse. The receiving device may then perform an action based on the binary value.

25 Claims, 9 Drawing Sheets

(56) References Cited

U.S. PATENT DOCUMENTS

| | | | |
|---|---|---|---|
| 6,006,150 A * | 12/1999 | Ueda | 701/53 |
| 6,070,114 A | 5/2000 | Fendt et al. | |
| 6,160,842 A | 12/2000 | DeLong et al. | |
| 6,164,532 A * | 12/2000 | Suga et al. | 235/380 |
| 6,188,494 B1 * | 2/2001 | Minteer | 398/135 |
| 6,256,557 B1 | 7/2001 | Avila et al. | |
| 6,300,799 B1 * | 10/2001 | Nakamura | 326/86 |
| 6,427,065 B1 * | 7/2002 | Suga et al. | 455/41.1 |
| 7,859,397 B2 | 12/2010 | Lamon et al. | |
| 8,154,436 B2 * | 4/2012 | Szajnowski | 342/70 |
| 8,508,206 B2 * | 8/2013 | Wan et al. | 323/283 |
| 8,634,480 B2 * | 1/2014 | Nuebling et al. | 375/258 |
| 8,705,592 B2 * | 4/2014 | Oh et al. | 375/216 |
| 2004/0071208 A1 * | 4/2004 | Yang et al. | 375/237 |
| 2005/0265462 A1 * | 12/2005 | Bueti et al. | 375/257 |
| 2006/0034449 A1 * | 2/2006 | Joerger | 379/413 |
| 2006/0203936 A1 * | 9/2006 | Roovers et al. | 375/317 |
| 2007/0280054 A1 * | 12/2007 | Watanabe | 368/120 |
| 2008/0279287 A1 * | 11/2008 | Asahina | 375/242 |
| 2008/0304580 A1 * | 12/2008 | Ichiyama | 375/259 |
| 2009/0009006 A1 * | 1/2009 | Jin et al. | 307/104 |
| 2009/0022306 A1 * | 1/2009 | Wang et al. | 379/413 |
| 2009/0033366 A1 * | 2/2009 | Yamamoto | 326/86 |
| 2009/0133942 A1 * | 5/2009 | Iisaka et al. | 178/43 |
| 2010/0085101 A1 * | 4/2010 | Walker et al. | 327/306 |
| 2012/0081177 A1 * | 4/2012 | Nuebling et al. | 327/590 |
| 2012/0315961 A1 * | 12/2012 | Chen et al. | 455/574 |
| 2013/0082516 A1 * | 4/2013 | Yamaguchi | 307/1 |
| 2013/0101056 A1 * | 4/2013 | Ahn et al. | 375/257 |
| 2013/0259166 A1 * | 10/2013 | Oh et al. | 375/340 |
| 2013/0272037 A1 * | 10/2013 | Aiello et al. | 363/21.17 |
| 2013/0278434 A1 * | 10/2013 | Schmitt et al. | 340/870.02 |
| 2014/0133586 A1 * | 5/2014 | Nuebling et al. | 375/258 |
| 2014/0197303 A1 * | 7/2014 | Kelly et al. | 250/208.1 |

FOREIGN PATENT DOCUMENTS

| | | |
|---|---|---|
| GB | 2 471 860 A | 1/2011 |
| WO | 02/33843 A1 | 4/2002 |

OTHER PUBLICATIONS

Atmel Corporation, 8-bit AVR Microcontroller with 2/4/8K Bytes In-System Programmable Flash ATtiny25/VATtiny45/V ATtiny85V, Apr. 2011, pp. 1-30.

* cited by examiner

PULSE-BASED BINARY COMMUNICATION

CROSS-REFERENCE TO RELATED APPLICATION

The present application is related to U.S. patent application Ser. No. 13/630,498, filed on the same day and entitled "TRANSIENT POWER COMMUNICATION", the entire contents of which are hereby incorporated by reference.

TECHNICAL FIELD

The present invention relates to communications, and more specifically, to a protocol for communications over a line that also transmits electrical power.

BACKGROUND

A typical power supply system for modules (also referred to throughout as a "modular power system") includes a centralized power source supplies energy to one or more modules (i.e., devices), that may, in turn, utilize the energy to perform various tasks. For example, a modular power system may receive alternating current (AC) power and generate direct current (DC) power to operate at least one lighting module. Some modular powers systems also contain control features. For example, control may be centralized in a "master" module that is configured to issue commands that cause one or more "slave" modules to alter operation. A typical control implementation has the master module being coupled to the slave modules via dedicated communication lines or via dedicated wireless communication. Another typical control implementation is to transmit communication over the same conductors that supply power to the slave modules, known in the art as "power line communications." Existing power line communications systems operate by impressing a modulated carrier signal on the wiring system.

SUMMARY

Conventional techniques for spreading control through a module power system suffer from a variety of deficiencies. Dedicated communication lines may not be feasible in systems that are limited by space and/or cost and must be equipped for hazardous operation. Dedicated wireless communication results in more complexity, and thus more cost, as a network of transmitters and receivers must be set up across the master module and the slave module. Conventional power line communication systems may be effective, but still require specialized communication circuit, increasing cost and complexity and requiring further space that may not be available. Further, in systems requiring simple interactions, conventional power line communication systems are frequently overkill.

Embodiments of the present invention provide systems and methods for communicating binary information that supports high level communications of increased length and complexity. An example system accordingly includes a transmitting device and a receiving device. The transmitting device is configured to generate a supply voltage for use in operating the receiving device and to cause at least one pulse to occur in the supply voltage, the at least one pulse being based on a binary value. The receiving device is configured to receive the supply voltage from the transmitting device, to detect the at least one pulse in the supply voltage and to determine the binary value based on the at least one pulse.

The at least one pulse may be, and in some embodiments is, a short duration transient occurring in the supply voltage. In some embodiments, the at least one pulse may actually be a time-arranged pattern of pulses sent within a predetermined time period, the pattern of pulse corresponding to a logical bit or group of logical bits in the binary value. The time-arranged pattern of pulses may comprise, for example, one or more pulses that occur at certain time instances within the predetermined time period. Transmission of the binary value may, for example, be preceded by a pattern of pulses indicating that the binary value is to follow and/or may be followed by a pattern of pulses indicating that the binary value is complete.

The receiving device may be configured to detect pulses in the supply voltage. In one embodiment, after detecting a first pulse in the supply voltage the receiving device may be configured to activate a window timer corresponding to the predetermined time period. The receiving device may then record the detection of pulses in the supply voltage during the duration of the window timer. In one embodiment the receiving device may simply count the pulses detected during the duration of the window timer and may convert the count of pulses into a logical bit (e.g., a "0" or "1"). The window timer may then be reset for receipt of further pulses corresponding to logical bits. The logical bits may then be combined to form the binary value. Alternatively, the receiving device may record time instances when pulses are detected during the duration of the window timer, the time instances when the pulses were detected forming a received pulse pattern. The received pulse pattern may then be converted into a logical bit or a group of logical bits. The window timer may then be reset for the receipt of further pulses and the receiving device may then again start recording the time instances when bits are detected. The logical bits or groups of logical bits may then be combined by the receiving device to form the binary value. Regardless of how the binary value is formed, in one embodiment the binary value may be interpreted by the receiving device as a command to execute an action, and the receiving device may then execute the action that is instructed by the receipt of the binary value.

In an embodiment, there is provided a system. The system includes: a transmitting device configured to generate a supply voltage and to cause at least one pulse to occur in the supply voltage, the at least one pulse being based on a binary value; and a receiving device configured to receive the supply voltage, to detect the at least one pulse and to determine the binary value based on the at least one pulse.

In a related embodiment, the at least one pulse may include a short duration transient in the supply voltage. In another related embodiment, the transmitting device may be further configured to cause a time-arranged pattern of pulses to occur within a predetermined time period, the pattern of pulses corresponding to one of a logical bit and a group of logical bits in the binary value. In a further related embodiment, the transmitting device may be further configured to cause a pattern of pulses to occur indicating to the receiving device that the binary value is to follow, and after communication of the binary value is complete, to cause a pattern of pulses to occur indicating to the receiving device that the binary value is complete. In another further related embodiment, the receiving device may be further configured to activate a window timer after detecting a first pulse in the supply voltage, the window timer having a duration corresponding to the predetermined time period. In a further related embodiment, the receiving device may be further configured to record time instances corresponding to when pulses are detected during the duration of the window timer, the time instances when the pulses were detected forming a received pulse pattern, and to convert the received pulse pattern into one of a logical bit and a group of logical bits. In another further related embodiment, the receiving device may be further configured to count the pulses detected in the supply voltage during the duration of the window timer and to convert the count of detected pulses into a logical bit. In a further related embodiment, the receiving device may be further configured to combine logical bits resulting from different window timer durations to determine the binary value. In a further related embodiment, the receiving device may be further configured to combine the logical bits or groups of logical bits resulting from different window timer durations to determine the binary value.

In yet another related embodiment, the receiving device may be further configured to execute an action based on the binary value.

In another embodiment, there is provided a method. The method includes: determining that a trigger action has occurred in a transmission device; loading a binary value into a send register based on the trigger action; selecting one of a next logical bit and a next group of logical bits in the send register; and causing at least one pulse to occur in a supply voltage being supplied by the transmission device, the at least one pulse being based on one of the selected next logical bit and the selected group of logical bits.

In a related embodiment, causing may include causing at least one pulse to occur in a supply voltage being supplied by the transmission device, the at least one pulse being based on one of the selected next logical bit and the selected group of logical bits, the at least one pulse comprising a short duration transient in the supply voltage. In another related embodiment, causing may include causing at least one pulse to occur in a supply voltage being supplied by the transmission device, the at least one pulse being based on one of the selected next logical bit and the selected group of logical bits, the at least one pulse comprising a time-arranged pattern of pulses corresponding to one of the selected next logical bit and the selected next groups of logical bits, the pattern of pulses based on a timer activated after the loading of the binary value.

In still another related embodiment, the method may further include: continuing selecting one of the next logical bit and the next group of logical bits in the send register and continuing causing the at least one pulse to occur until all of the logical bits or all of the groups of logical bits in the send register have been selected.

In another embodiment, there is provided a method. The method includes: detecting pulses occurring in a supply voltage; recording information corresponding to the detected pulses; converting the information into one of logical bits and groups of logical bits; and combining one of the logical bits and the groups of logical bits into a binary value.

In a related embodiment, detecting may include detecting pulses occurring in a supply voltage, wherein each detected pulse comprises a short duration transient in the supply voltage. In another related embodiment, the method may further include activating a window timer after detecting a first pulse in the supply voltage, the window timer being activated for a duration. In a further related embodiment, recording information may include counting the pulses detected in the supply voltage during the duration of the window timer, and converting the information comprises converting the count of detected pulses into a logical bit. In another further related embodiment, recording information may include recording time instances corresponding to when pulses are detected during the duration of the window timer, the time instances when the pulses were detected forming a received pulse pattern, and converting the information may include converting the received pulse pattern into one of a logical bit and a group of logical bits.

In yet another related embodiment, the method may further include executing an action based on the binary value.

In another embodiment, there is provided a master module. The master module includes: a master processor; a master memory system; and a master interconnection mechanism, allowing communication between the master processor, the master memory system, and the master module circuit; wherein the master memory system includes a pulse transmission application, that when executed in the master processor as a pulse transmission process, causes the master module to perform operations of: determining that a trigger action has occurred in a transmission device; loading a binary value into a send register based on the trigger action; selecting one of a next logical bit and a next group of logical bits in the send register; and causing at least one pulse to occur in a supply voltage being supplied by the transmission device, the at least one pulse being based on one of the selected next logical bit and the selected group of logical bits.

In a related embodiment, causing may include causing at least one pulse to occur in a supply voltage being supplied by the transmission device, the at least one pulse being based on one of the selected next logical bit and the selected group of logical bits, the at least one pulse comprising a short duration transient in the supply voltage. In another related embodiment, causing may include causing at least one pulse to occur in a supply voltage being supplied by the transmission device, the at least one pulse being based on one of the selected next logical bit and the selected group of logical bits, the at least one pulse comprising a time-arranged pattern of pulses corresponding to one of the selected next logical bit and the selected next groups of logical bits, the pattern of pulses based on a timer activated after the loading of the binary value.

In still another related embodiment, the master module may further perform operations of: continuing selecting one of the next logical bit and the next group of logical bits in the send register and continuing causing the at least one pulse to occur until all of the logical bits or all of the groups of logical bits in the send register have been selected.

In another embodiment, there is provided a slave module. The slave module includes: a slave processor; a slave memory system; and a slave interconnection mechanism, allowing communication between the slave processor, the slave memory system, and the slave module circuit; wherein the slave memory system includes a pulse interpreter application, that when executed in the slave processor as a pulse interpreter process, causes the slave module to perform operations of: detecting pulses occurring in a supply voltage; recording information corresponding to the detected pulses; converting the information into one of logical bits and groups of logical bits; and combining one of the logical bits and the groups of logical bits into a binary value.

In a related embodiment, detecting may include detecting pulses occurring in a supply voltage, wherein each detected pulse comprises a short duration transient in the supply voltage. In another related embodiment, the slave module may further perform operations of activating a window timer after detecting a first pulse in the supply voltage, the window timer being activated for a duration. In a further related embodiment, recording information may include counting the pulses detected in the supply voltage during the duration of the window timer, and converting the information comprises converting the count of detected pulses into a logical bit. In another further related embodiment, recording information may include recording time instances corresponding to when pulses are detected during the duration of the window timer, the time instances when the pulses were detected forming a received pulse pattern, and converting the information may include converting the received pulse pattern into one of a logical bit and a group of logical bits.

In yet another related embodiment, the slave module may further perform operations of executing an action based on the binary value.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
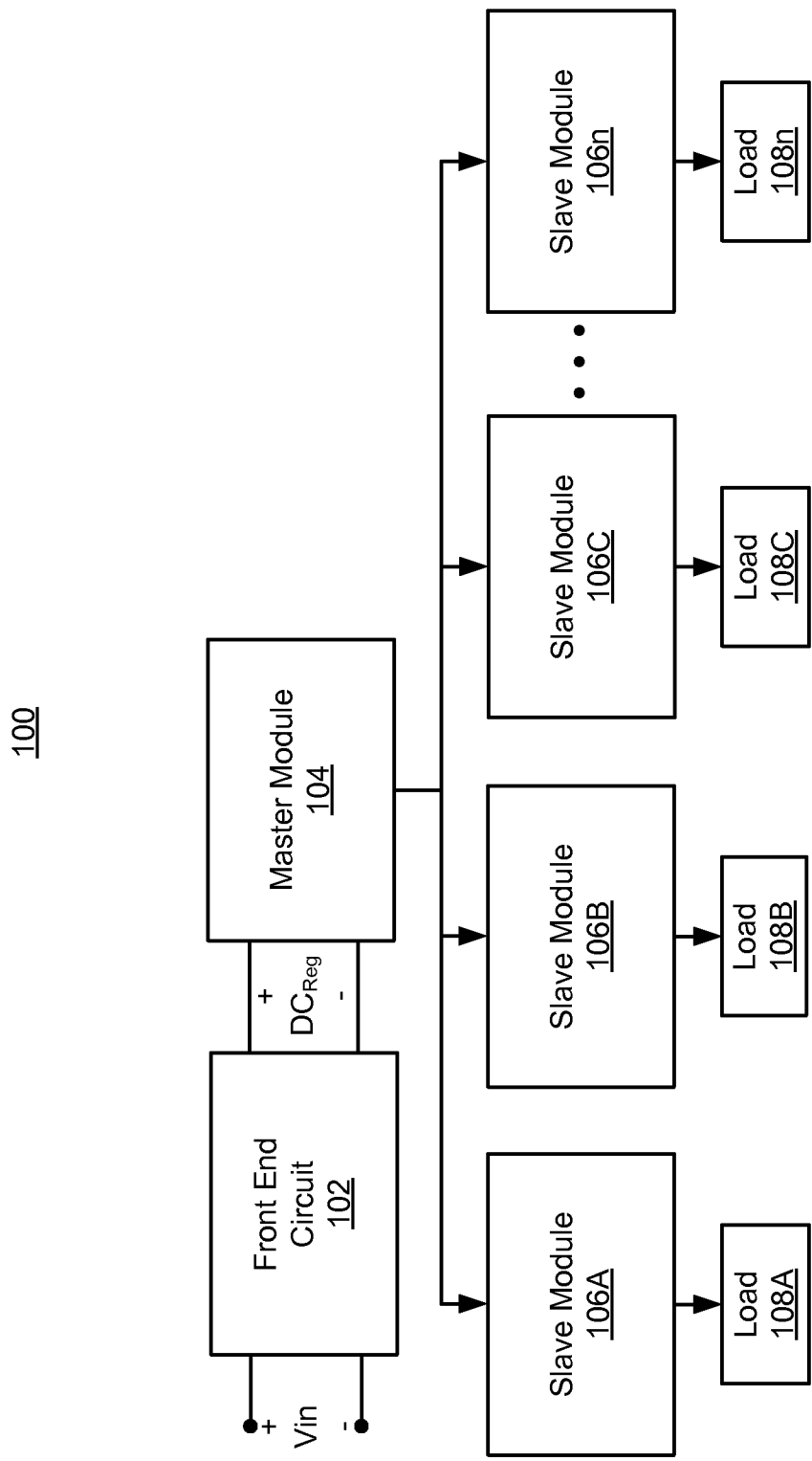
FIG. 1 shows a block diagram of a power supply system according to embodiments disclosed herein.
Figure 2:
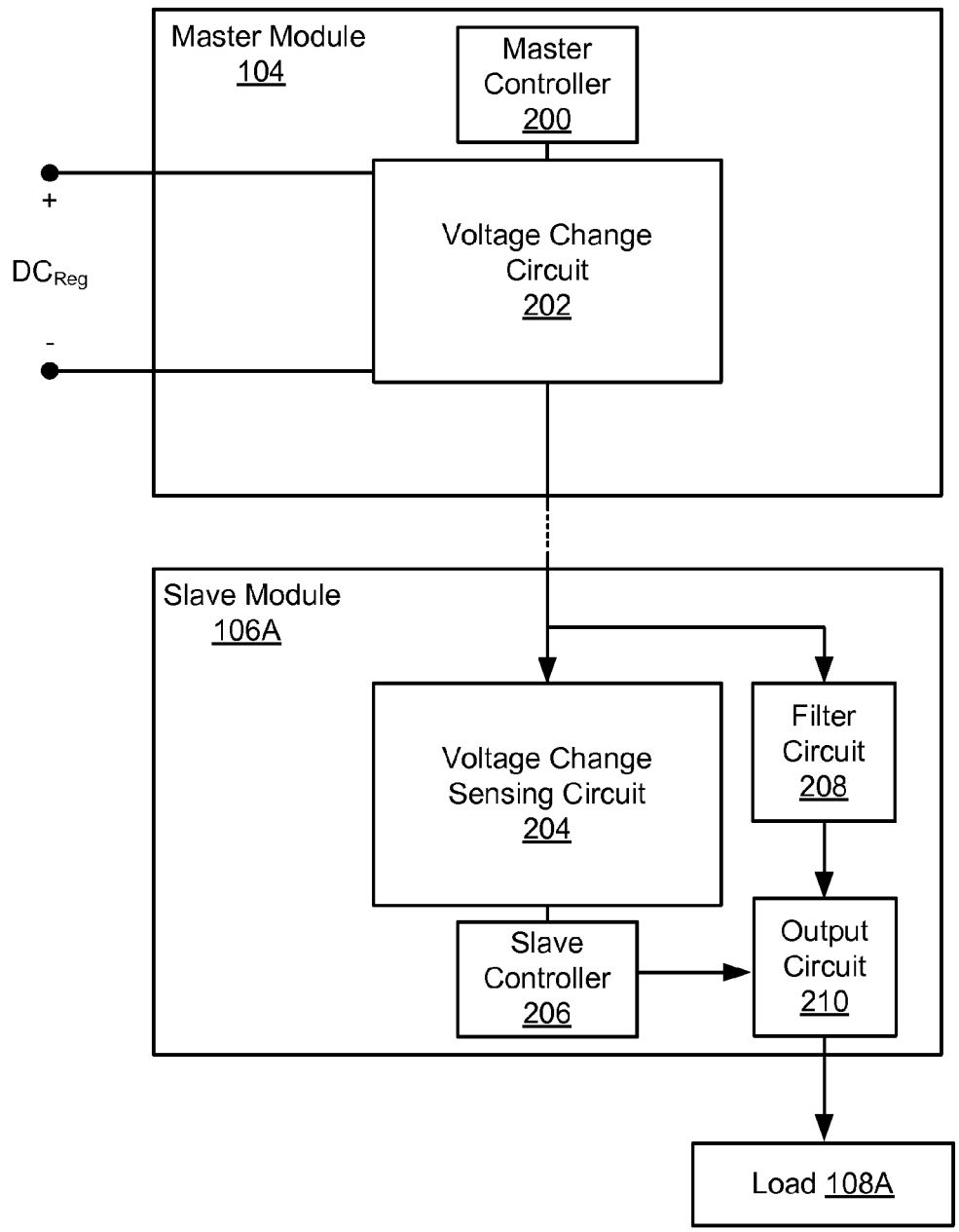
FIG. 2 shows a block diagram of a master module, a slave module, and a load of the power supply system of FIG. 1 according to embodiments disclosed herein.

FIGS. 1 and 2 show embodiments of a power supply system 100 and its various components, as described herein. The power supply system 100 is described in greater detail in related co-pending U.S. patent application Ser. No. 13/630, 498 entitled "TRANSIENT POWER COMMUNICATION" and also assigned to OSRAM SYLVANIA Inc. of Danvers, Mass., the entire contents of which are hereby incorporated by reference.

FIG. 1 shows a block diagram of a modular power supply system, which includes a front end circuit 102, a master module 104, and one or more slave modules 106A, 106B, 106C . . . 106n (collectively, the slave modules 106A-n). In some embodiments, the slave modules 106A-n are each coupled to respective loads, that is, the slave module 106A is coupled to a load 108A, the slave module 106B is coupled to a load 108B, the slave module 106C is coupled to a load 108C, and so forth. The front end circuit 102 is any circuit able to receive power from an AC voltage source (e.g., 120VAC/60 Hz line source, 120-277 VAC at 50-60 Hz line source, etc.) or a DC voltage source (e.g., DC generator, battery, etc.) and to generate therefrom a regulated front end DC voltage $DC_{Reg}$. In embodiments where the front end circuit 102 receives an AC voltage an input, the front end circuit 102 may comprise an electromagnetic interference (EMI) filter and/or rectifier circuit that is configured to receive the AC voltage, filter out any interference, and to rectify the AC voltage into a DC input voltage. For example, the front end circuit 102 may comprise a capacitor arranged across the high and low AC input rails in to filter out EMI, and a diode rectifier configured to receive an AC input voltage and to generate the regulated front end DC voltage $DC_{Reg}$ therefrom.

The master module 104 is configured to receive the regulated front end DC voltage $DC_{Reg}$ from the front end circuit 102 and to output either a normal supply voltage or a reduced supply voltage as a supply voltage. The master module 104 outputs the supply voltage to the slave modules 106A-n, which use it to operate their respective loads 108A, 108B, 108C, . . . 108n (collectively, the loads 108A-n). In some embodiments, the master module 104 includes a master controller (not shown in FIG. 1 but shown in FIG. 2). The master controller is configured to determine that information needs to be communicated to the slave modules 106A-n and to enable the master module to so communicate it, among other tasks. For example, a user of the modular power supply system 100 may configure a user interface of the master module 104 (not shown in the figures) to indicate a control input. In embodiments where the loads 108A-n are light sources, the control input may indicate, for example, to raise or lower the amount of light output the light sources. The controller in the master module 104 then causes this information to be communicated to the slave modules 106A-n as described herein. The slave modules 106A-n receive this communicated information, as described herein, and control the light sources accordingly. While the slave modules 106A-n and the loads 108A-n have been illustrated in FIG. 1 and elsewhere as separate components, in some embodiments, the loads 108A-n are incorporated with their respective slave modules 106A-n to form a consolidated slave module/load apparatus (not shown in the figures). Further, while in FIG. 1 each load is shown as being coupled to a respective slave module, in some embodiments, more than one load is coupled to a single slave module.

FIG. 2 shows a block diagram of a master module, a slave module, and a load of the power supply system 100 of FIG. 1 in greater detail. The master module 104 includes a voltage change circuit 202 and a master controller 200. The voltage change circuit is connected to the front end circuit 102 of FIG. 1 and generates a supply voltage, which is then output by the master module 104. The supply voltage is either a normal supply voltage or a reduced supply voltage, with both types based on the regulated front end DC voltage $DC_{Reg}$ received from the front end circuit 102. The normal supply voltage is the typical output used by one or more of the slave modules 106A-n to operate one or more loads 108A-n. Thus, what is considered to be a normal supply voltage varies depending on the load and/or loads connected to the master module and its slave modules. In some embodiments, for example, where the loads 108A-n are solid state light sources, the normal supply voltage may be 24V. The reduced supply voltage is a voltage that is less than the normal supply voltage, and thus will also vary depending on a value for the normal supply voltage. The voltage change circuit generates the reduced supply voltage in any number of ways, some of which are described in greater detail below. The voltage change circuit 202 has two modes of operation. In the first mode of operation, the voltage change circuit generates the normal supply voltage as the supply voltage output by the master module. In the second mode of operation, the voltage change circuit 202 generates the reduced supply voltage as the supply voltage output by the master module. The mode of operation of the voltage change circuit 202 changes based on reception of a control input from the master controller 200. In some embodiments, the voltage change circuit 202 defaults to the first mode of operation when no control input has been received from the master controller 200.

Thus, the master controller 200 controls the type of supply voltage generated by the voltage change circuit 202 by providing a control input to the voltage change circuit 202 that causes the voltage change circuit 202 to change its mode of operation. The control input is based on the communication the master module is to send to the slave module, as is described herein. In some embodiments, the master controller 200 is configured to receive input from an outside source, for example but not limited to another module, a user interface, etc. The master controller 200 in such embodiments uses this input to create the control input. For example, the master controller 200 may receive an input from a user interface that indicates that the master module 104 should communicate information to a slave module to cause its load to operate differently than it is currently operating. The master controller translates the received input into a control input that is related to the information to be communicated. That is, sending the particular control input to the voltage change circuit 202 will cause the voltage change circuit to adjust the supply voltage it (and the master module 104) output to the appropriate slave module in such a way that the information to be communicated is communicated to the appropriate slave module, which will cause the appropriate slave module to change its load output, bringing about the desired change in the operation of the load. Any format that is capable of being communicated by a change in the supply voltage may be used, such as but not limited to those described throughout this application. Thus, the control input causes the voltage change circuit 202 to generate a normal supply voltage and/or a reduced supply voltage based on the received input. In some embodiments, the master controller 200 alternatively or additionally includes stored instructions, which may be stored within the master controller 200 upon manufacture and/or before sale and/or at some other time, such that the stored instructions provide one or more control inputs to be sent to the voltage change circuit 202 at certain times and/or based on certain operating conditions of a load connected to the master module 104 via one or more slave modules. In other words, the master controller 200 is capable of receiving a control input in any way and then provides the control input to the voltage change circuit 202.

Though only the slave module 106A is shown in FIG. 2, the slave module 106B, the slave module 106, . . . the slave module 106n may, and in some embodiments do, have the same configuration(s) of the slave module 106A. Thus, the disclosed configurations of the slave module 106A may be applied to any of the slave modules 106A-n. The slave module 106A includes a voltage change sensing circuit 204, a slave controller 206, a filter circuit 208, and an output circuit 210. The load 108A is coupled to the slave module 106A, and more particularly, to the output circuit 210. The voltage change sensing circuit 204 and the filter circuit 208 are configured to receive the supply voltage, which is either the normal supply voltage or the reduced supply voltage, from the master module 104. The voltage change sensing circuit 204 is configured to generate logic level voltages based on the received supply voltage. The logic level voltages correspond to changes in the received supply voltage, and thus to the information being communicated by the master module 104 to the slave module 106A. For example, receiving the normal supply voltage may result in the voltage change sensing circuit 204 generating a logic level of "1" (e.g., 24V) and receiving the reduced supply voltage may result in the voltage change sensing circuit 204 generating a logic level of "0" (e.g., 10 V), or vice versa. A particular combination of "1"s and "0"s may correspond to a particular command for the slave module 106A in relation to its load 108A, for example but not limited to change an operating parameter of the load 108A. Of course, other variations in the received supply voltage are also possible, such as but not limited to latches (e.g., a change in logic level occurs only after the voltage change sensing circuit 204 receives two different supply voltages in succession). Alternatively, or additionally, other combinations of "1"s and "0"s are used to communication information.

The logic level voltage(s) are sent by the voltage change sensing circuit 204 to the slave controller 206. The slave controller 206 interprets the received logic level voltages as a communication of information from the master module. The slave controller 206 performs this interpretation in any number of known ways. For example, the slave controller 206 may include a memory system that stores combinations of "1"s and "0"s in a lookup table, with each combination associated with a particular command and/or sequence of commands. Alternatively, or additionally, certain voltage logic level sequences may result in the activation and/or de-activation of one or more certain circuits with the slave controller 206. The slave controller 206 outputs a control output to the output circuit 210 that is based on the interpreted communicated information. The format of the control output depends on the information communicated to the slave module 106A. For example, in some embodiments, the control output is a signal that causes the output circuit 210 to vary the frequency of its load output signal, such as but not limited to a pulse width modulated signal. In some embodiments, the control output is a signal that causes the output circuit 210 to vary the amplitude of its load output signal. The slave controller 206 is capable of outputting any control output that is capable of affecting the operation of the load 108A.

The filter circuit 208 also receives the supply voltage from the master module 104. The filter circuit 208 is configured to supply a substantially continuous normal supply voltage to the output circuit 208, from where it is sent to the load 108A as described below, regardless of whether the filter circuit 208 receives the normal supply voltage or the reduced supply voltage. In other words, the filter circuit 208 protects the load 108A from ever receiving the reduced supply voltage, which would interrupt and/or modify operation of the load 108A, while still allowing the slave module 106A to receive the reduced supply voltage, thus permitting communication of information from the master module 104 to the slave module 106A through changes in the supply voltage. The filter circuit also filters out any unwanted variations in the supply voltage.

The output circuit 210 receives the normal supply voltage from the filter circuit 208 as the control output, if any, from the slave controller 206. The output circuit 210 provides a load output to the load 108A connected to the slave module 106A that is based on the output normal supply voltage and the control output, if any. Thus, if there is no control output, the output circuit 210 simply passes the output normal supply voltage from the filter circuit 208 to the load 108A. However, should the master module 104 communicate to the slave module 106A a change in the operation of the load 108A connected to the slave module 106A, the output circuit uses the control output from the slave controller 206, which corresponds to the change in operation, to modify the output normal supply voltage from the filter circuit 208 appropriately so as to create a load output that causes the desired change in operation in the load 108A.

While in FIG. 2 the slave controller 206 and the output circuit 210 are shown as separate elements, in some embodiments, these may be combined into a single element having the functionality of both the slave controller 206 and the output circuit 210. Thus, for example, the combined circuit may be a microcontroller that is capable of performing the operations of both the slave controller 206 and the output circuit 210, and thus would be connected to both the filter circuit 208 and the voltage change sensing circuit 204.

Embodiments described herein include communication systems and methods that may be implemented using various equipment as described throughout, however, embodiments are not intended to be limited to implementation with only the equipment described herein. References made to any of the above embodiments of a power supply system are merely for the sake of explanation herein. Embodiments described throughout may be, and in some embodiments are, implemented using any combination of hardware and software and combinations thereof that is configurable to support the disclosed example functionality, operations, etc.

As described above, the master module 104 is configured to interact with the slave modules 106A-n via transients in the supply voltage. For example, a single transient may be employed, for example, to trigger actions in a load connected to a slave module, such as but not limited to dimming a light source. A transient may also be latched to control continuous operations. However, the communication requirements of some applications may not be satisfied with simple triggering or latching or related simple commands. Some applications may require a variety of commands to be communicated, and in some embodiments, commands may need to be addressed only to a particular one and/or ones of the slave modules 106A-n. These more advanced types of control may require the communication of digital information that may be interpreted by a receiving device to identify a particular command to be executed, and possibly the device for which the command is intended.

For example, the master controller 200 in the master module 104 and the slave controller 206 in the slave modules 106A-n may be microcontrollers capable of executing instructions provided by program code stored in a machine-readable storage medium such as, for example, random-access memories (RAM), permanent or rewritable read-only memories (ROM) based in electronic (e.g., BIOS, Flash, etc.), magnetic (e.g., hard disk, floppy disk, etc.) or optical technologies (compact disk (CD), digital video disk (DVD), etc.). Additionally, or alternatively, in some embodiments the master module 104 and the slaves modules 106A-n may be configured in shown in FIGS. 5A and 5B, respectively, which are described in greater detail below. For example, the master controller 200 in some embodiments is configured to process input from a user interface (not shown) coupled to the master module 104 and to cause the master module 104 to transmit a command based on the user input to one or more of the slave modules 106A-n via changes in the transmitted supply voltage. Conversely, the slave controller 206 in some embodiments is configured to detect the communication via the supply voltages received, to interpret whether the communication is intended for one or more of the slave modules 106A-n, to determine a command from the communication, and to cause an action to be performed by one or more of the slave modules 106A-n based on the command. Communication of this sort may be conducted readily over a dedicated communication infrastructure. However, in accordance with embodiments disclosed herein, the potential negative effect of prolonged reduced supply voltage transients on the operation of slave modules 106A-n may need to be considered. Instantaneous drops in supply voltage (e.g., for transmitting trigger signals) may be absorbed easily by the filter circuit 208, but prolonged or continuous drops in the supply voltage due to the communication of larger amounts of information (for example but not limited to digital information) may overwhelm the filter circuit 208. In particular, the use of transients based on a reduced supply voltage to communicate long strings of bits could cause the buffer charge in the filter circuit 208 to be quickly depleted, resulting in a supply voltage drop being seen by the output circuit 210, which could lead to possible malfunction or even damage occurring in the slave modules 106A-n and/or the loads 108A-n.

In some embodiments, a system for communicating binary information is provided that may support higher level communications while avoiding the above issues. An example system accordingly includes a transmitting device (e.g., the master module 104 of FIGS. 1 and 2, the master module 504 of FIG. 5A) and a receiving device (e.g., the slave modules 106A-n of FIGS. 1 and 2, the slave module 506A of FIG. 5B). The transmitting device is configured to generate a supply voltage for use in operating the receiving device and to cause at least one pulse to occur in the supply voltage, the at least one pulse being based on a binary value. The receiving device is configured to receive the supply voltage from the transmitting device, to detect the at least one pulse in the supply voltage and to determine the binary value based on the at least one pulse.

Figure 3:
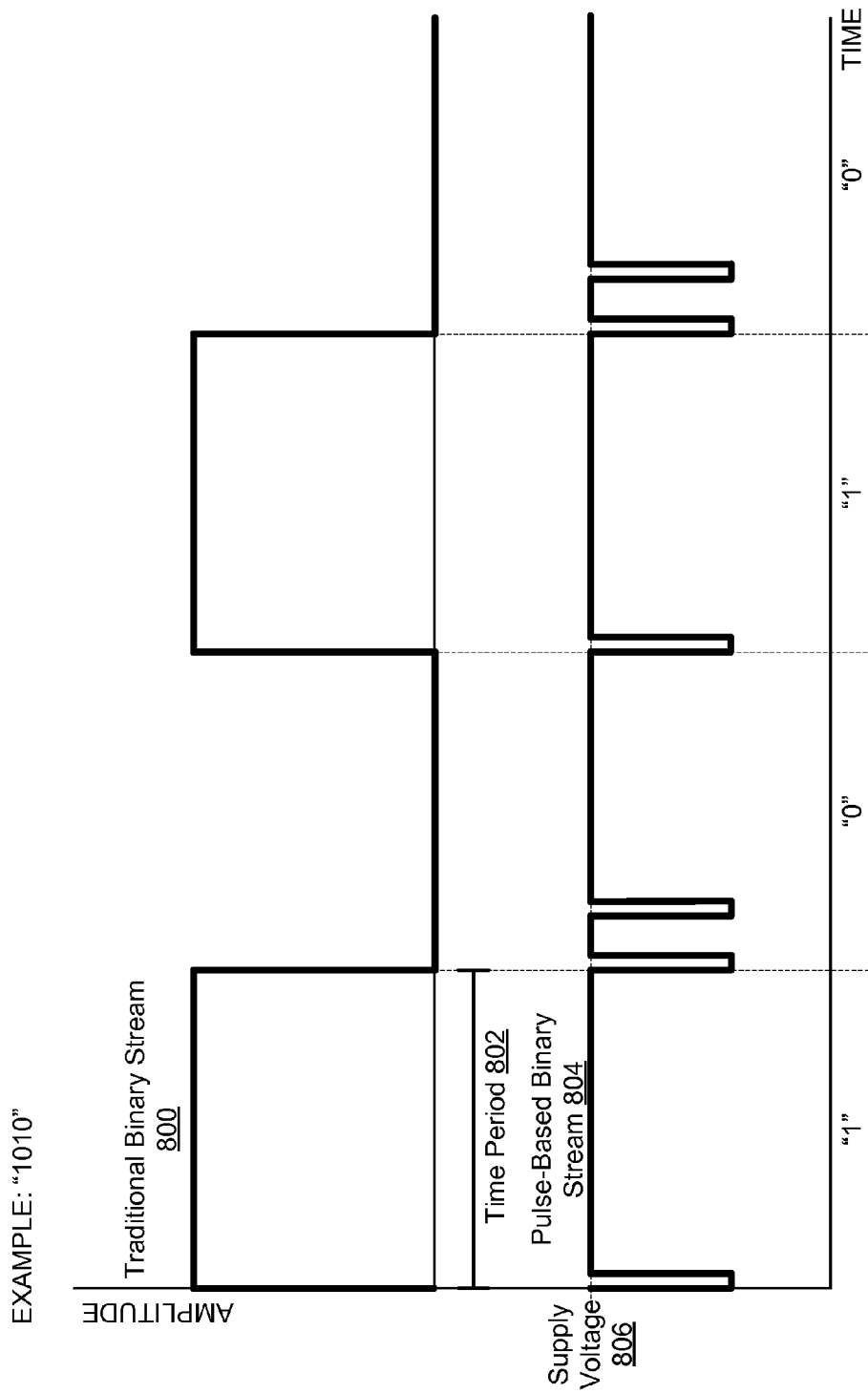
FIG. 3 illustrates a comparison of a traditional binary stream and an example pulse-based binary stream according to embodiments disclosed herein.

FIG. 3 illustrates a comparison of a traditional binary stream 800 and a pulse-based binary stream 804. The traditional binary stream 800 includes, for example, logical high values (e.g., 5 volts) and logical low values (e.g., 0 volts) maintained over predetermined any number of time periods 802. When communicating using an infrastructure dedicated only to communication, the signal type, frequency, amplitude, etc. may be dictated by the communication protocol, componentry, etc. The system is highly configurable because the only concern is how communication will be conducted. In embodiments as described herein, the duration of communications may be a concern in that some signals may be able to overcome safeguards built into the system. For example, in the traditional binary stream 800 the initial "1" may be communicated by, for example, using a reduced supply voltage transient. The supply voltage would have to be reduced for the entire duration of the time period 802 to communicate. Reducing the supply voltage for this duration may deplete the buffer charge stored by the filter circuit 208 so that the output circuit 210 does not see the supply voltage 806 drop when transients take place. As previously described, the filter circuit 208 may not be able to maintain the supply voltage for the full duration of the time period 802, and thus, a supply voltage drop may be seen by the output circuit 210, possibly causing a malfunction or even damage to the output circuit 210 and/or the loads 108A-n.

Figure 4:
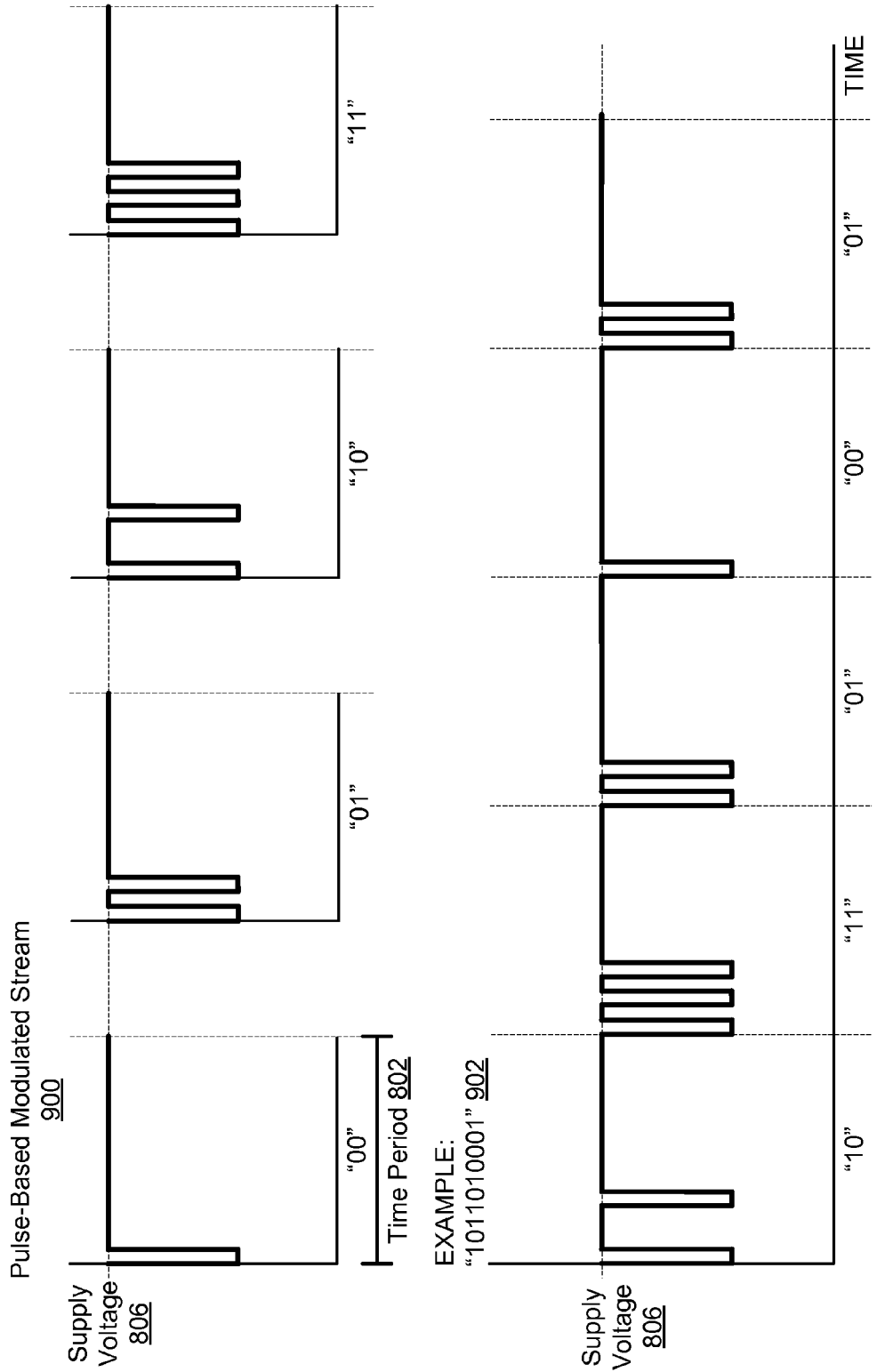
FIG. 4 illustrates a pulse-based modulated stream according to embodiments disclosed herein.

In some embodiments, the pulse-based binary stream 804 is employed in place of the traditional binary stream 800 to lessen the impact of communications on the supply voltage 806. Combinations of short pulses may be used to replace holding the supply voltage at a certain level for the entire duration of the time period 802. Pulses may be short duration transients (e.g., voltage drops) in the supply voltage 806. It is important to note that the shape and/or duration of the pulses depicted in FIGS. 3 and 4 are not drawn to scale, and are meant for the sake of explanation only. In some embodiments, the duration of the pulses are desired to be as short as possible to mitigate any disturbances in the supply voltage. For example, the duration of "ideal" pulses should be just long enough for the receiving device to perceive as intended changes in state of the supply voltage without introducing any electromagnetic interference (EMI) issues. In some embodiments, the pulses may be as short as 50 nanoseconds in a 2.5 microsecond time period, resulting in a pulse to time period width ratio of about 1/50. However, these values may vary depending on the application.

In FIG. 3 as shown, the pulse-based binary stream 804 uses one pulse to represent a logical "1" and two pulses to represent a logical "0." For example, the transmitting device may cause the pulses to occur at certain time instances within the time period 802, so that the receiving device is able to interpret the voltage transients as pulses. Thus, in the example of FIG. 3 the digital value "1010" is transmitted by the transmitting device causing a first pulse in a first time period 802 to be followed by two pulses in a second time period 802, which may be followed again by one pulse in a third time period 802 and two pulses in a fourth time period 802. In some embodiments, the receiving device counts the pulses that it detects in each time period 802, and converts the counted pulses from each time period 802 into a logical bit. The logical bit corresponding to each time period 802 is then combined to determine the binary value. The receiving device in some embodiments then performs an action based on the binary value. At least one benefit that may be realized by communicating using the pulse-based binary stream 804 is that the filter circuit 208 is only exposed to instantaneous voltage transients, and thus, the filter circuit 208 may be able to absorb these short voltage transients without allowing the supply voltage 806 as supplied to the output circuit 210 to drop. Moreover, communication between the master module 104 and the slave modules 106A-n may be expanded beyond simple triggering or latching operations because various digital values comprising one or more bits may be communicated.

In some embodiments, the transmitting device is configured to precede the sending of a binary value with a certain pattern of pulses indicating to the receiving device that the digital value will follow. This activity may serve as a wake-up to the receiving device and thus indicate when the first bit of a new binary value will follow. While not illustrated in FIG. 3, an example of a "start value" pattern may be three pulses occurring in the same time period 802. Similarly, the same or a different pattern of pulses may also indicate that the binary value is complete. The receiving device may then, for example, know that an entire binary value has been received and may perform an action based on binary value, may realize that the entire binary value has not been received (e.g., if no "complete value" pattern is received) and may enter an error state, etc.

FIG. 4 illustrates a pulse-based modulated stream 900. In FIG. 4, similarly to FIG. 3, pulses (e.g., short transients in the supply voltage 806) may be used to communicate binary information. However, in the pulse-based modulated stream 900, patterns including one or more pulses occurring at certain time instances within the time period 802 are employed to communicate more than one bit per time period 802. For example, the bit combination "00" may be communicated with one pulse at the beginning of the time period 802, the bit combination "01" may be communicated by two sequential pulses, the bit combination "10" may be communicated by a pulse followed by a space followed by another pulse, and the bit combination "11" may be communicated by three sequential bits. The benefit of using the pulse-based modulated stream 900 is that two bits are communicated in each time period 802 instead of one, and thus, a greater amount of information may be communicated more quickly. An example 902 is shown in FIG. 4, wherein the binary value "1011010001" is communicated in just five time periods 802. However, the pulse-based modulated stream 900 is also more complex to interpret than the pulse-based binary stream 804 of FIG. 3. In the pulse-based binary stream 804, the receiving device just has to count the detected pulses. Instead, in the pulse-based modulated stream 900, the receiving device must keep track of detected pulses and when each of the detected pulses is detected in the time period 802. Pulse detection timing is needed because determining the logical bit or group of logical bits is based on the timing of the detected pulses within the time period 802 (e.g., the received pulse pattern), not just the count of the pulses. While not shown, the example 902 of FIG. 4 may also employ start-of-value and end-of-value pulse patterns to indicate to the receiving device when transmission of a binary value is about to start and when it will be complete. For example, given the example 902 of FIG. 4, it may be possible to use a pattern of four sequential pulses as a start-of-value and an end-of-value pulse pattern.

Employing either the pulse-based binary stream 804 or the pulse-based modulated binary stream 900 may introduce new functionality into systems such as the power supply system 100 of FIG. 1. In some embodiments, the master module 104 is configured to not only send commands to the slave modules 106A-n, but is also able to designate particular slave modules (e.g., slave module 106A) to which the command is intended. For example, the master module 104 may be configured to communicate (e.g., cause pulses to occur in the supply voltage 806) the identity of a slave module (e.g., a binary value corresponding to slave module 106A) and to then follow the slave module identity with a binary value corresponding to a command intended for the slave module 106A. Even though all of the slave modules 106A-n may be configured to receive the binary value via pulses in the supply voltage, the slave modules 106B-n may be configured to ignore the command because of the initial indication of the intended recipient. In this manner, the slave modules 106A-n may be configured independently. In embodiments where the slave modules 106A-n include controllers for solid state light sources, commands may be issued to each controller to turn on/off certain solid state light sources, set a dimming level in certain solid state light sources, set a color for certain solid state light sources, etc.

Figure 6:
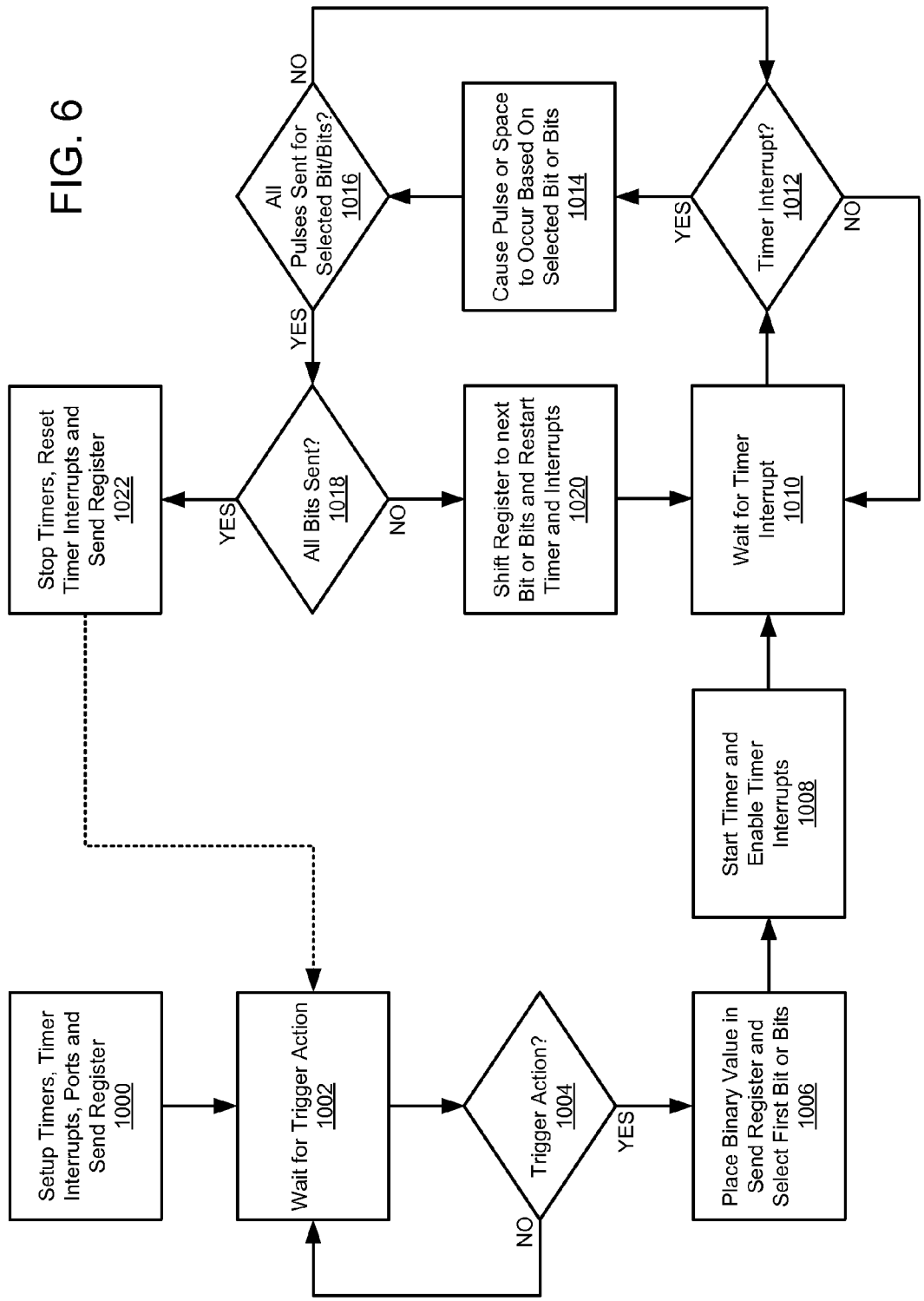
FIG. 6 is a flowchart of operations for pulse-based binary communication from the perspective of a transmitting device according to embodiments disclosed herein.

FIG. 6 illustrates a flowchart of operations for pulse-based binary communication from the perspective of a transmitting device consistent with the present disclosure. In an operation 1000, general setup occurs for timers, timer interrupts, ports, a send register, etc. In operations 1002 and 1004, the transmitting device waits for a trigger action. A trigger action may be but is not limited to, for example, any action that would require the transmission of a binary value. For example, a processor within the transmitting device may sense interaction with a user interface, and the interaction may warrant the transmission of a command (e.g., to at least one receiving device). If in the operation 1004 it is determined that a trigger action has occurred, then in an operation 1006 a binary value based on the trigger action (e.g., a binary value corresponding to a command to transmit to other devices) is placed into a send register and the first bit (or bits) to be transmitted are selected. Whether a bit or bits are being transmitted may depend on whether pulse-based binary communication or pulse-based binary modulated communication is being employed. In an operation 1008, a timer is started (e.g., activated) and timer interrupts are enabled in the transmitting device. The timer controls the duration of the time period in which the bit or bits are communicated, and the timer interrupt triggers time instances during the full duration of time period when pulses occur in the supply voltage.

In operations 1010 and 1012, the transmitting device waits for timer interrupts. If it is determined in the operation 1012 that a timer interrupt has occurred, then in the operation 1012 the transmitting device causes a pulse to occur in the supply voltage based on the selected bit or bits in an operation 1014. For example, if simple pulse-based communication is being used, pulses may occur sequentially because the receiving device is merely counting detected pulses. However, if modulated communication is being used, then pulses or spaces may occur based on the timing within the duration of the time period to cause a pulse pattern to be communicated to the receiving device. A determination is then made in an operation 1016 as to whether all of the pulses have been sent corresponding to the currently selected bit or bits. If it is determined in the operation 1016 that more pulses need to be sent corresponding to the selected bit or bits, then in the operation 1012, the transmitting device awaits the next timer interrupt. If in the operation 1016 it is determined that all pulses corresponding to the selected bit or bits have been sent, then in an operation 1018 a further determination is made as to whether all of the bits in the binary value have been sent. If it is determined in the operation 1018 that all of the bits in the binary value have not been sent, then in an operation 1020, a send register is shifted to the next bit or bits to be sent and the timer and interrupts are restarted. The operation 1020 is followed by a return to the operation 1010 to again await the next interrupt. If in the operation 1018 it is determined that all of the bits in the binary value have been sent, then in an operation 1022, the timer is stopped and the interrupts and send register are reset. Optionally, the operation 1022 may be followed by a return to the operation 1002 to prepare for the next trigger action to be detected.

Figure 7:
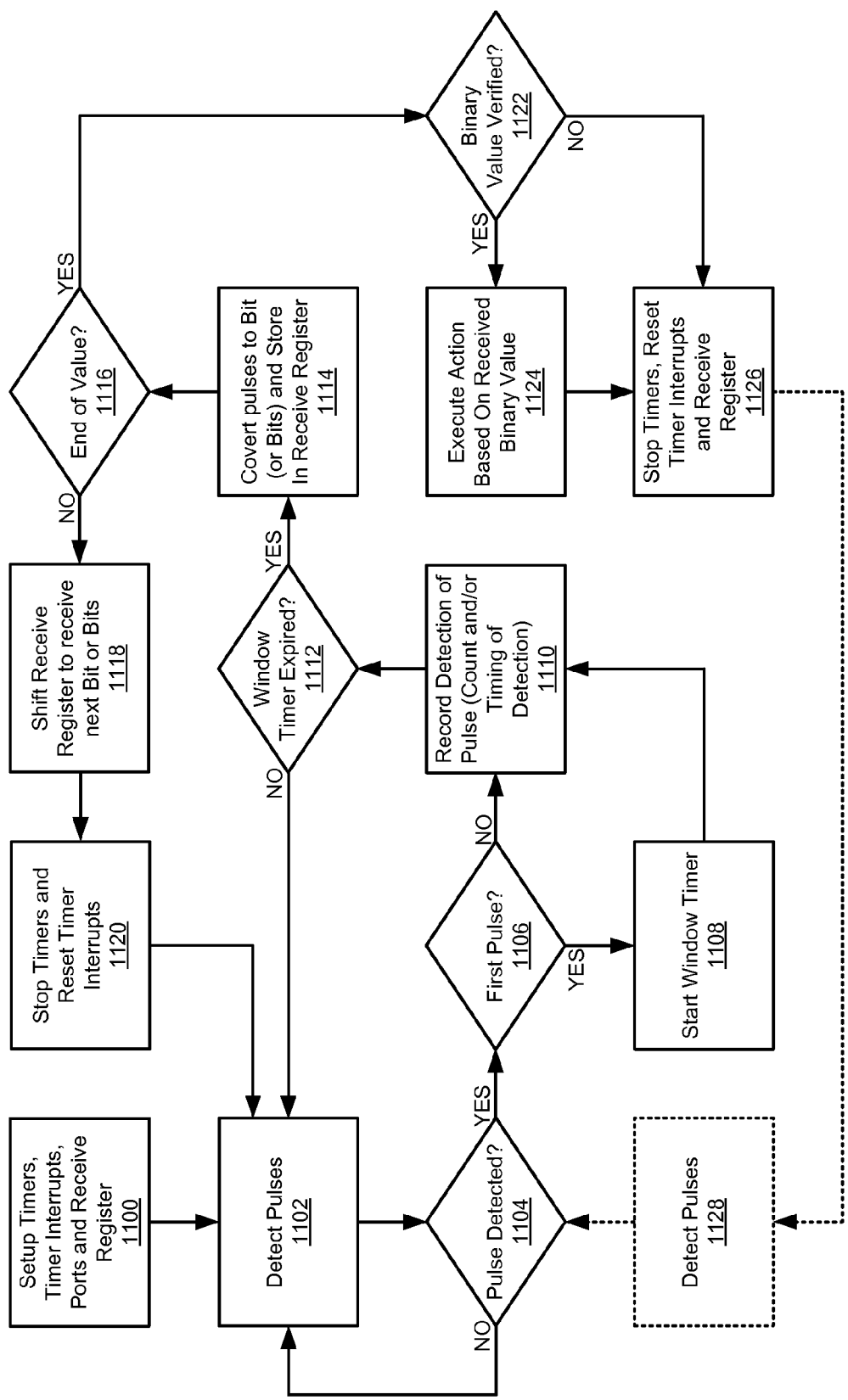
FIG. 7 is a flowchart of operations for pulse-based binary communication from the perspective of a receiving device according to embodiments disclosed herein.

FIG. 7 illustrates a flowchart of operations for pulse-based binary communication from the perspective of a receiving device. In an operation 1100, general setup occurs for timers, timer interrupts, ports, and a receive register. In operations 1102 and 1104, the receiving device starts monitoring the supply voltage for pulses. If in the operation 1104, a determination is made that a pulse has been detected, then in an operation 1106, a further determination is made as to whether a first pulse has been detected. If it is determined in the operation 1106 that a first pulse has been detected, then in an operation 1108, a window timer is activated. If in the operation 1106 the detected pulse is determined to not be a first pulse, or alternatively after the operation 1108, then in an operation 1110, the detection of the pulse is recorded. How a detected pulse is recorded may depend upon, for example but not limited to, the type of pulse-based communication being conducted. In some embodiments, the receiving device simply counts the detected pulses. Alternatively, the receiving device records the time instance when the pulse was detected during the window timer duration so that a received pulse pattern may be formulated. A determination is then made in an operation 1112 as to whether the window timer has expired. A determination in the operation 1112 that the window timer has not expired is followed by a return to the operation 1102 to continue detecting pulses.

If it is determined in the operation 1112 that the window timer has expired, then in an operation 1114, the received pulses are converted into a bit or a group of bits and stored in the receive register. A determination is then made in an operation 1116 as to whether the complete binary value has been received. If it is determined in the operation 1116 that the complete binary value has not been received, then in an operation 1118, the receive register is shifted to receive the next bit or bits and in an operation 1120, the timers are stopped and the timer interrupts are reset. The receiving device then continues detecting pulses in the supply voltage in the operation 1102. If in the operation 1116 it is determined that the binary value is complete (e.g., an end of value pulse pattern is received), then an in operation 1122 a further determination is made as to whether the binary value may be verified. For example, the receiving device may, and in some embodiments does, verify the integrity of the binary value by calculating a checksum, by comparing the binary value to a list of permitted command binary values, etc. If in the operation 1122 it is determined that the binary value may be verified (e.g., the checksum passes), then the receiving device executes an action based on the received binary value in an operation 1124. Either after it is determined in the operation 1122 that the binary value may not be verified (e.g., the checksum did not pass), or alternatively after the operation 1124, then in operation 1126, the timers are stopped, and the timer interrupts and the receive register are reset, which may be followed by an optional operation 1128, wherein the receiving device continues to detect pulses.

While FIGS. 6 and 7 illustrate various operations according to different embodiments, it is to be understood that not all of the operations depicted in FIGS. 6 and 7 are necessary for other embodiments. Indeed, it is fully contemplated herein that in other embodiments of the present disclosure, the operations depicted in FIGS. 6 and 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Figure 5A:
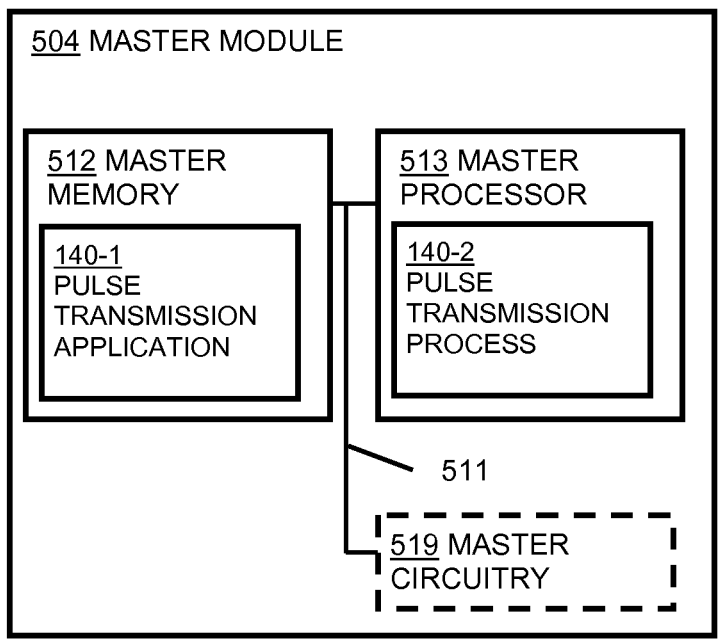
FIG. 5A shows a master module to transmit information according to embodiments disclosed herein.
Figure 5B:
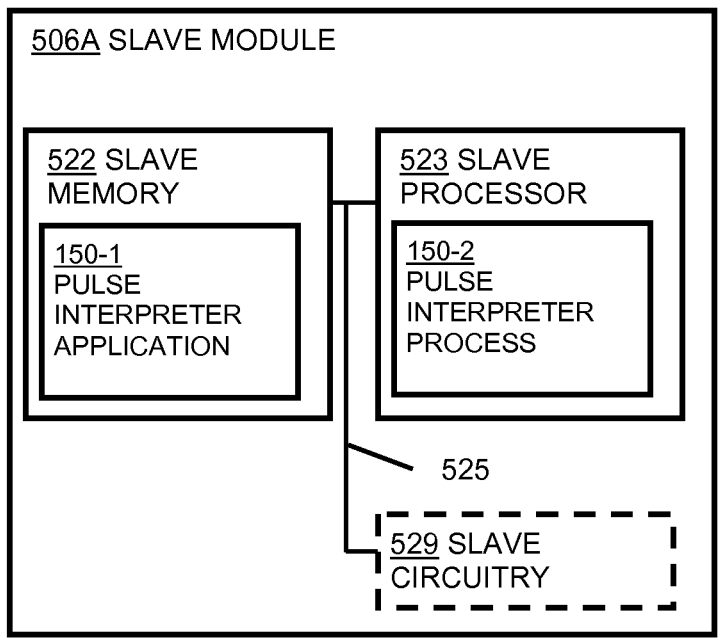
FIG. 5B shows a slave module to receive and act on information according to embodiments disclosed herein.

FIGS. 5A and 5B show different embodiments of a master module 504 and a single slave module 506A, respectively, by illustrating example architecture of each. The master module 504 executes, runs, interprets, operates or otherwise performs a pulse transmission application 140-1 and a pulse transmission process 140-2. The slave module 506A executes, runs, interprets, operates or otherwise performs a pulse interpreter application 150-1 and a pulse interpreter process 150-2.

The master module 504 may be any type of computing device, and in some embodiments includes a computer device (e.g., a microprocessor, microcontroller, etc.) of any size and/or shape and/or configuration. As shown in FIG. 5A, the master module 504 includes a master interconnection mechanism 511, such as but not limited to a data bus or other circuitry, that couples a master processor 513, a master memory 512 (also referred to herein as a master memory system 512), and optional master circuitry 519. The optional master circuitry 519 may, and in some embodiments does, include the various circuits of the master module 104 shown in FIG. 1 and any of its variations. In some embodiments, the optional master circuitry 519 includes an input interface via which the master module 504A receives user input.

The master memory 512 is any type of computer readable medium and in some embodiments is encoded with a pulse transmission application 140-1 that includes a pulse transmission process 140-2. The pulse transmission application 140-1 may be embodied as software code such as data and/or logic instructions (e.g., code stored in the master memory 512 or on another computer readable medium such as a removable disk) that supports processing functionality according to different embodiments described herein. During operation of the master module 504, the master processor 513 accesses the master memory 512 via the master interconnection mechanism 511 in order to launch, run, execute, interpret or otherwise perform the logic instructions of the pulse transmission application 140-1. Execution of the pulse transmission application 140-1 in this manner produces processing functionality in a pulse transmission process 140-2. In other words, the pulse transmission process 140-2 represents one or more portions or runtime instances of the pulse transmission application 140-1 performing or executing within or upon the master processor 513 in the master module 504 at runtime.

It is noted that example configurations disclosed herein include the pulse transmission application 140-1 itself including the pulse transmission process 140-2 (i.e., in the form of un-executed or non-performing logic instructions and/or data). The pulse transmission application 140-1 may be stored on a computer readable medium (such as a floppy disk), hard disk, electronic, magnetic, optical or other computer readable medium. The pulse transmission application 140-1 may also be stored in the master memory 512 such as in firmware, read only memory (ROM), or, as in this example, as executable code in, for example, Random Access Memory (RAM). In addition to these embodiments, it should also be noted that other embodiments herein include the execution of the pulse transmission application 140-1 in the master processor 513 as the pulse transmission process 140-2. Those skilled in the art will understand that the master module 504 may include other processes and/or software and hardware components that are not shown in FIG. 5A and are not described in the above example.

The slave module 506A may also be any type of computing device, and in some embodiments includes a computer device (e.g., a microprocessor, microcontroller, etc.) of any size and/or shape and/or configuration. As shown in FIG. 5B, the slave module 506A includes a slave interconnection mechanism 525, such as but not limited to a data bus or other circuitry, that couples a slave processor 523, a slave memory 522 (also referred to herein as a slave memory system 522), and optional slave circuitry 529. The optional slave circuitry 529 may, and in some embodiments does, include the various circuits of the slave module 104 shown in FIG. 1 and any of its variations. In some embodiments, the optional slave circuitry 529 includes an input interface via which the slave module 506AA receives user input.

The slave memory 522 is any type of computer readable medium and in some embodiments is encoded with a pulse interpreter application 150-1 that includes a pulse interpreter process 150-2. The pulse interpreter application 150-1 may be embodied as software code such as data and/or logic instructions (e.g., code stored in the slave memory 522 or on another computer readable medium such as a removable disk) that supports processing functionality according to different embodiments described herein. During operation of the slave module 506A, the slave processor 523 accesses the slave memory 522 via the slave interconnection mechanism 525 in order to launch, run, execute, interpret or otherwise perform the logic instructions of the pulse interpreter application 150-1. Execution of the pulse interpreter application 150-1 in this manner produces processing functionality in a pulse interpreter process 150-2. In other words, the pulse interpreter process 150-2 represents one or more portions or runtime instances of the pulse interpreter application 150-1 performing or executing within or upon the slave processor 523 in the slave module 506A at runtime.

It is noted that example configurations disclosed herein include the pulse interpreter application 150-1 itself including the pulse interpreter process 150-2 (i.e., in the form of un-executed or non-performing logic instructions and/or data). The pulse interpreter application 150-1 may be stored on a computer readable medium (such as a floppy disk), hard disk, electronic, magnetic, optical or other computer readable medium. The pulse interpreter application 150-1 may also be stored in the slave memory 522 such as in firmware, read only memory (ROM), or, as in this example, as executable code in, for example, Random Access Memory (RAM). In addition to these embodiments, it should also be noted that other embodiments herein include the execution of the pulse interpreter application 150-1 in the slave processor 523 as the pulse interpreter process 150-2. Those skilled in the art will understand that the slave module 506A may include other processes and/or software and hardware components that are not shown in FIG. 5B and are not described in the above example.

Figure 8:
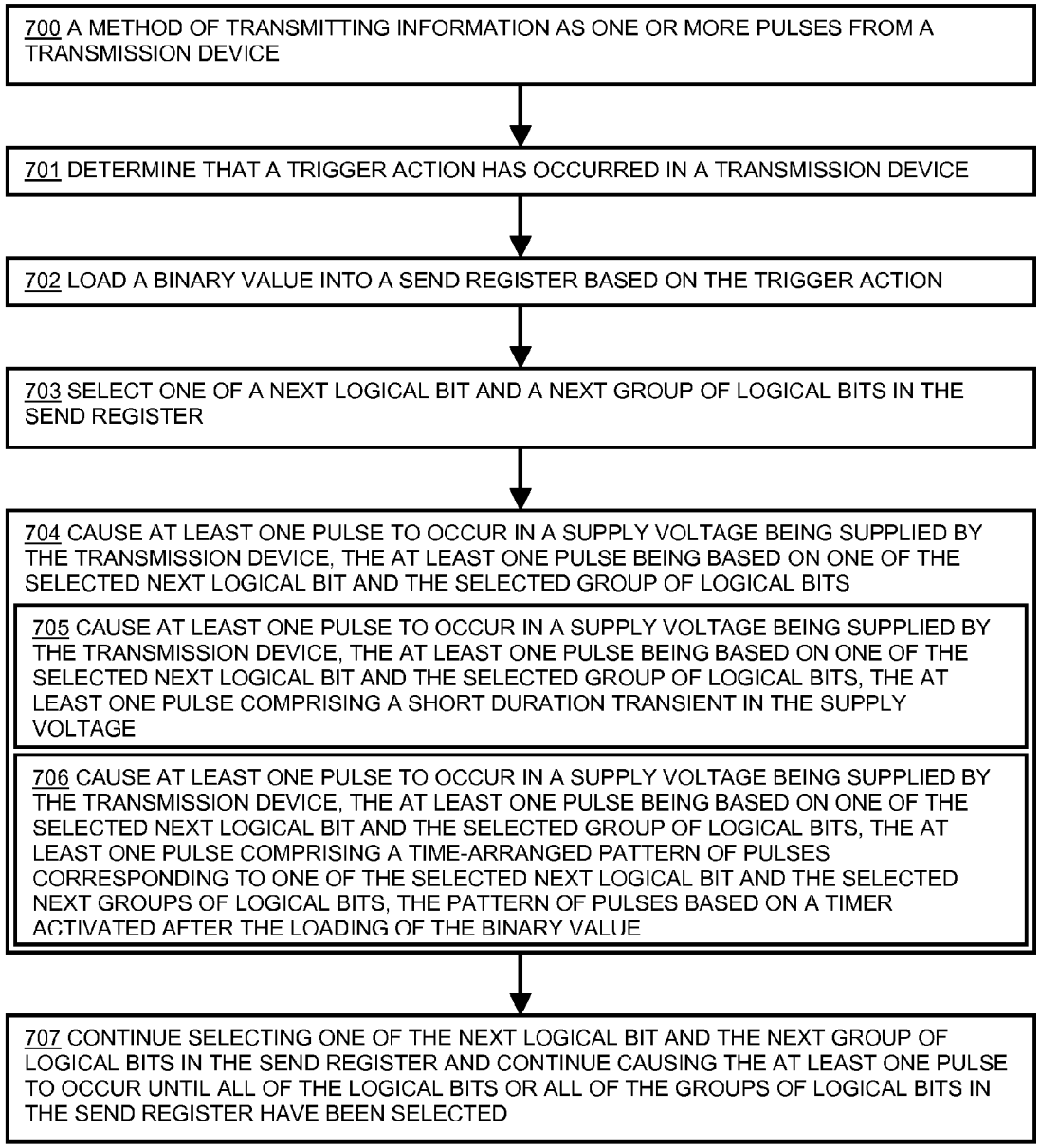
FIG. 8 is a flowchart of a method of transmitting information via transient pulses according to embodiments disclosed herein.
Figure 9:
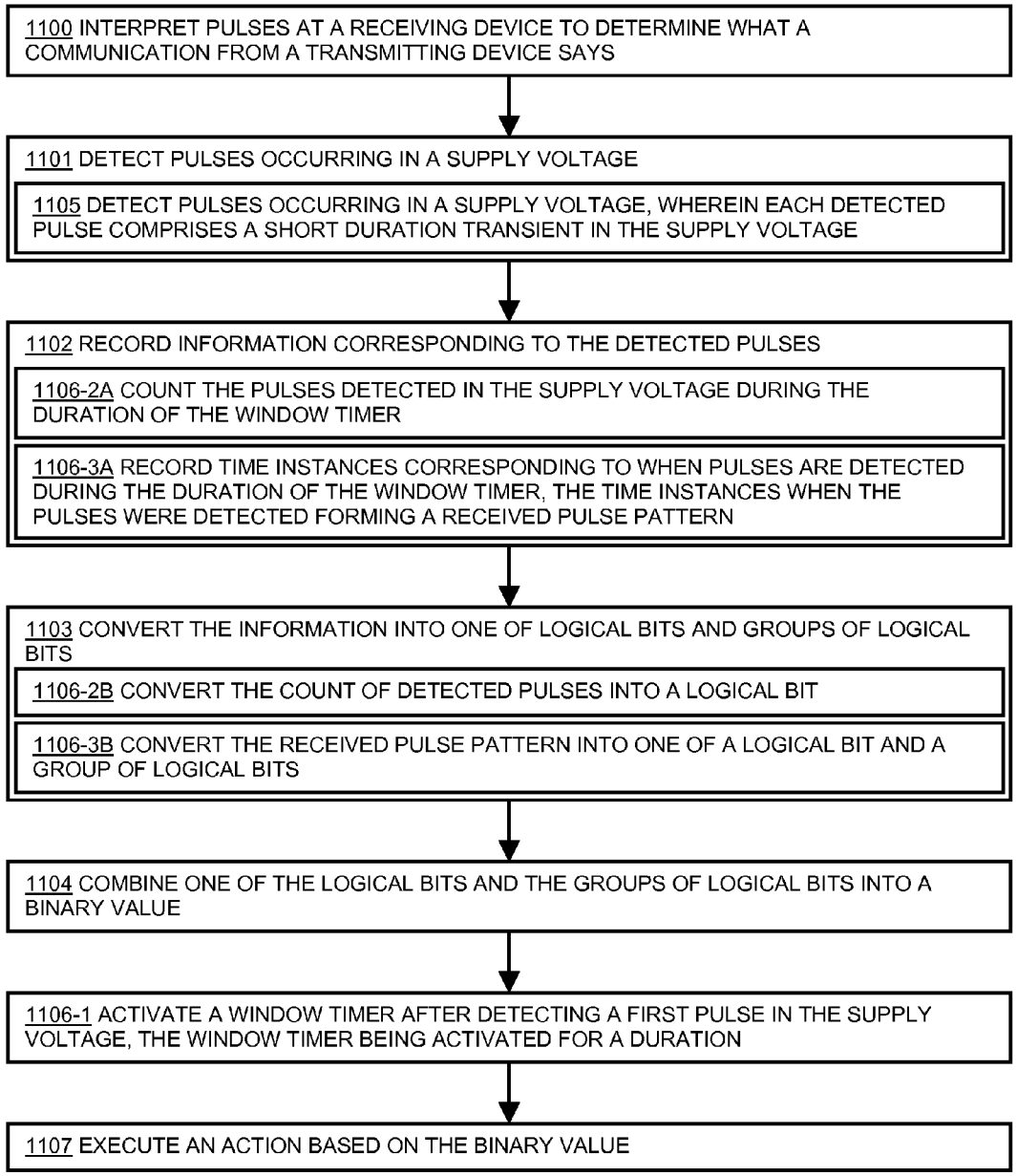
FIG. 9 is a flowchart of a method of receiving and interpreting information from transient pulses according to embodiments disclosed herein.

A number of flowcharts of methods disclosed throughout are illustrated in FIGS. 8-9. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 8-9 illustrate various flowcharts of procedures performed by the master module 504 of FIG. 5A and the slave module 506A of FIG. 5B when performing pulsed transient power communication as described throughout the application.

FIG. 8 shows a method 700 of transmitting information as one or more pulses from a transmission device. The transmission device, in some embodiments, is the master module 504 shown in FIG. 5A, and components described below are part of the master module 504, for example but not limited to as a part of the master processor 513, the master memory system 512, and/or the optional master circuitry 519. In some embodiments, the transmission device is the master module 104 shown in FIGS. 1 and/or 2, and of course may include other devices and/or components. First, it is determined that a trigger action has occurred in a transmission device, step 701. Then, a binary value is loaded into a send register based on the trigger action, step 702. Next, one of a next logical bit and a next group of logical bits in the send register is selected, step 703. Finally, at least one pulse is caused to occur in a supply voltage being supplied by the transmission device, step 704, the at least one pulse being based on one of the selected next logical bit and the selected group of logical bits. In some embodiments, at least one pulse is caused to occur in a supply voltage being supplied by the transmission device, the at least one pulse being based on one of the selected next logical bit and the selected group of logical bits, the at least one pulse comprising a short duration transient in the supply voltage, step 705. In some embodiments, at least one pulse is caused to occur in a supply voltage being supplied by the transmission device, the at least one pulse being based on one of the selected next logical bit and the selected group of logical bits, the at least one pulse comprising a time-arranged pattern of pulses corresponding to one of the selected next logical bit and the selected next groups of logical bits, the pattern of pulses based on a timer activated after the loading of the binary value, step 706. In some embodiments, the method 700 further includes continuing selecting one of the next logical bit and the next group of logical bits in the send register and continuing causing the at least one pulse to occur until all of the logical bits or all of the groups of logical bits in the send register have been selected, step 707.

FIG. 9 shows a method 1100 of interpreting pulses at a receiving device to determine what a communication from a transmitting device says. First, pulses occurring in a supply voltage are detected, step 1101. Information corresponding to the detected pulses is recorded, step 1102. The information is converted into one of logical bits and groups of logical bits, step 1103. One of the logical bits and the groups of logical bits are combined into a binary value, step 1104.

In some embodiments, the step 1101 includes detecting pulses occurring in a supply voltage, wherein each detected pulse comprises a short duration transient in the supply voltage, step 1105.

In some embodiments, the method 1100 further includes activating a window timer after detecting a first pulse in the supply voltage, the window timer being activated for a duration, step 1106-1. In some embodiments, the step 1102 then includes counting the pulses detected in the supply voltage during the duration of the window timer, step 1106-2A, and the step 1103 then includes converting the information comprises converting the count of detected pulses into a logical bit, step 1106-2B. In some embodiments, the step 1102 alternatively includes recording time instances corresponding to when pulses are detected during the duration of the window timer, the time instances when the pulses were detected forming a received pulse pattern, step 1106-3A, and the step 1103 then includes converting the received pulse pattern into one of a logical bit and a group of logical bits, step 1106-3B.

In some embodiments, the method 1100 further includes executing an action based on the binary value, step 1107.

As used in any embodiment herein, a "circuit" or "circuitry" may comprise, for example, singly or in any combination, hardwired circuitry, programmable circuitry, state machine circuitry, and/or firmware that stores instructions executed by programmable circuitry.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system, comprising:
   a transmitting device configured to generate a supply voltage and to cause at least one pulse to occur in the supply voltage, the at least one pulse being based on a binary value, wherein the at least one pulse comprises a short duration transient in the supply voltage; and
   a receiving device configured to receive the supply voltage, to detect the at least one pulse and to determine the binary value based on the at least one pulse.

2. The system of claim 1, wherein the transmitting device is further configured to cause a time-arranged pattern of pulses to occur within a predetermined time period, the pattern of pulses corresponding to one of a logical bit and a group of logical bits in the binary value.

3. The system of claim 2, wherein the transmitting device is further configured to cause a pattern of pulses to occur indicating to the receiving device that the binary value is to follow, and after communication of the binary value is complete, to cause a pattern of pulses to occur indicating to the receiving device that the binary value is complete.

4. The system of claim 2, wherein the receiving device is further configured to activate a window timer after detecting a first pulse in the supply voltage, the window timer having a duration corresponding to the predetermined time period.

5. The system of claim 4, wherein the receiving device is further configured to record time instances corresponding to when pulses are detected during the duration of the window timer, the time instances when the pulses were detected forming a received pulse pattern, and to convert the received pulse pattern into one of a logical bit and a group of logical bits.

6. The system of claim 4, wherein the receiving device is further configured to count the pulses detected in the supply voltage during the duration of the window timer and to convert the count of detected pulses into a logical bit.

7. The system of claim 6, wherein the receiving device is further configured to combine logical bits resulting from different window timer durations to determine the binary value.

8. The system of claim 7, wherein the receiving device is further configured to combine the logical bits or groups of logical bits resulting from different window timer durations to determine the binary value.

9. The system of claim 1, wherein the receiving device is further configured to execute an action based on the binary value.

10. A method, comprising:
    determining that a trigger action has occurred in a transmission device;
    loading a binary value into a send register based on the trigger action;
    selecting one of a next logical bit and a next group of logical bits in the send register; and
    causing at least one pulse to occur in a supply voltage being supplied by the transmission device, the at least one pulse being based on one of the selected next logical bit and the selected group of logical bits, the at least one pulse comprising a short duration transient in the supply voltage.

11. The method of claim 10, wherein causing comprises:
    causing at least one pulse to occur in a supply voltage being supplied by the transmission device, the at least one pulse being based on one of the selected next logical bit and the selected group of logical bits, the at least one pulse comprising a time-arranged pattern of pulses corresponding to one of the selected next logical bit and the selected next groups of logical bits, the pattern of pulses based on a timer activated after the loading of the binary value.

12. The method of claim 10, further comprising:
    continuing selecting one of the next logical bit and the next group of logical bits in the send register and continuing causing the at least one pulse to occur until all of the logical bits or all of the groups of logical bits in the send register have been selected.

13. A method comprising:
    detecting pulses occurring in a supply voltage, wherein each detected pulse comprises a short duration transient in the supply voltage;
    recording information corresponding to the detected pulses;
    converting the information into one of logical bits and groups of logical bits; and
    combining one of the logical bits and the groups of logical bits into a binary value.

14. The method of claim 13, further comprising:
    activating a window timer after detecting a first pulse in the supply voltage, the window timer being activated for a duration.

15. The method of claim 14, wherein recording information comprises:
    counting the pulses detected in the supply voltage during the duration of the window timer, and converting the information comprises converting the count of detected pulses into a logical bit.

16. The method of claim 14, wherein recording information comprises:
    recording time instances corresponding to when pulses are detected during the duration of the window timer, the time instances when the pulses were detected forming a received pulse pattern; and wherein converting the information comprises:
    converting the received pulse pattern into one of a logical bit and a group of logical bits.

17. The method of claim 13, further comprising:
    executing an action based on the binary value.

18. A master module, comprising:
    a master processor;
    a master memory system; and
    a master interconnection mechanism, allowing communication between the master processor and the master memory system;
wherein the master memory system includes a pulse transmission application, that when executed in the master processor as a pulse transmission process, causes the master module to perform operations of:
    determining that a trigger action has occurred in a transmission device;
    loading a binary value into a send register based on the trigger action;
    selecting one of a next logical bit and a next group of logical bits in the send register; and
    causing at least one pulse to occur in a supply voltage being supplied by the transmission device, the at least one pulse being based on one of the selected next logical bit and the selected group of logical bits, the at least one pulse comprising a short duration transient in the supply voltage.

19. The master module of claim 18, wherein causing comprises:
    causing at least one pulse to occur in a supply voltage being supplied by the transmission device, the at least one pulse being based on one of the selected next logical bit and the selected group of logical bits, the at least one pulse comprising a time-arranged pattern of pulses corresponding to one of the selected next logical bit and the selected next groups of logical bits, the pattern of pulses based on a timer activated after the loading of the binary value.

20. The master module of claim 18, further comprising operations of:
    continuing selecting one of the next logical bit and the next group of logical bits in the send register and continuing causing the at least one pulse to occur until all of the logical bits or all of the groups of logical bits in the send register have been selected.

21. A slave module, comprising:
    a slave processor;
    a slave memory system; and
    a slave interconnection mechanism, allowing communication between the slave processor and the slave memory system;
wherein the slave memory system includes a pulse interpreter application, that when executed in the slave processor as a pulse interpreter process, causes the slave module to perform operations of:
    detecting pulses occurring in a supply voltage, wherein each detected pulse comprises a short duration transient in the supply voltage;
    recording information corresponding to the detected pulses;
    converting the information into one of logical bits and groups of logical bits; and
    combining one of the logical bits and the groups of logical bits into a binary value.

22. The slave module of claim 21, further comprising operations of:
    activating a window timer after detecting a first pulse in the supply voltage, the window timer being activated for a duration.

23. The slave module of claim 22, wherein recording information comprises:
    counting the pulses detected in the supply voltage during the duration of the window timer, and converting the information comprises converting the count of detected pulses into a logical bit.

24. The slave module of claim 22, wherein recording information comprises:
    recording time instances corresponding to when pulses are detected during the duration of the window timer, the time instances when the pulses were detected forming a received pulse pattern; and
wherein converting the information comprises:
    converting the received pulse pattern into one of a logical bit and a group of logical bits.

25. The slave module of claim 21, further comprising operations of:
    executing an action based on the binary value.

* * * * *